United States Patent
Ho et al.

(10) Patent No.: US 7,254,714 B2
(45) Date of Patent: Aug. 7, 2007

(54) METHOD OF PERFORMING AN AUTHENTICATION ON A SUBSCRIBER IDENTITY MODULE CARD BY AN ELECTRONIC COMMUNICATION DEVICE

(75) Inventors: Tai Shui Ho, Taipei Hsien (TW); Shih Kuang Tsai, Taipei Hsien (TW); Fu Zu Li, Shanghai (CN)

(73) Assignee: Inventec Appliances Corp., Taipei Hsien (TW)

( * ) Notice: Subject to any disclaimer, the term of this patent is extended or adjusted under 35 U.S.C. 154(b) by 708 days.

(21) Appl. No.: 10/671,532

(22) Filed: Sep. 29, 2003

(65) Prior Publication Data
US 2005/0071685 A1     Mar. 31, 2005

(51) Int. Cl.
*G06F 1/24* (2006.01)
(52) U.S. Cl. .................. 713/182; 713/161; 713/168; 713/193
(58) Field of Classification Search .......... 713/182, 713/161, 168, 193
See application file for complete search history.

(56) References Cited

U.S. PATENT DOCUMENTS

| | | | | |
|---|---|---|---|---|
| 4,718,005 A | * | 1/1988 | Feigenbaum et al. | 709/222 |
| 4,799,153 A | * | 1/1989 | Hann et al. | 726/3 |

* cited by examiner

*Primary Examiner*—Thomas R. Peeso
(74) *Attorney, Agent, or Firm*—Bacon & Thomas, PLLC

(57) ABSTRACT

This invention discloses a method of performing an authentication on an identity module card by an electronic communication device through installing an identification software provided by a telecommunication service provider into an electronic communication device to identify whether a subscriber identity module card is installed therein, and request a user to input an authentication data provided by the telecommunication service provider into the electronic communication device for enabling the electronic communication device to execute the booting procedure for communicating with others through the telecommunication service provider.

5 Claims, 1 Drawing Sheet

METHOD OF PERFORMING AN AUTHENTICATION ON A SUBSCRIBER IDENTITY MODULE CARD BY AN ELECTRONIC COMMUNICATION DEVICE

BACKGROUND OF THE INVENTION

1. Field of the Invention

The present invention relates to a method of performing an authentication on an identity module card by an electronic communication device.

2. Description of the Related Art

Since the wireless communication industry is blooming in these years, the price of wireless communication equipments is dropping, and more people are using wireless communication equipments. The commonly used mobile phone is an example. Furthermore, the technologies of various electronic industries are progressing, various electronic communication equipments tend to be developed in the light, thin, short, and compact design, and the functions are designed and enhanced to satisfy the consumer's needs. Therefore, the small and portable mobile phone has become an important and popular communication tool. The popular application of mobile phones definitely provides a good business opportunity with good profit for the telecommunication companies. The competition between telecommunication companies also become very severe as its market is not evenly allocated.

At present, many telecommunication companies use different business models for the sales promotion of their telecommunication services, among which a free mobile phone and at least one phone number are given as free gifts to customers, and these telecommunication companies earn money merely through charging communication service fees from the customers once every predetermined period (such as the monthly rental or telephone fee). Such promotion method can effectively lower the entry requirement of using mobile phones, and enhance the intentions of the customers to use the telecommunication services provided by the telecommunication companies who offer the above mention promotion program, and thus greatly increasing the population of using their telecommunication services.

However, many users utilize such promotion programs to obtain free-charged mobile phones from the telecommunication companies as a free gift, but playing tricks with the telecommunication companies by changing the subscriber identity module card installed therein to use the telecommunication service provided by another telecommunication company. This kinds of tricks is not only contrary to the policy of attracting the customers to use the telecommunication service provided by the telecommunication company, but severely cause damages to the telecommunication companies. Therefore, the way for effectively controlling the customers who obtain the free-charged mobile phone from the telecommunication companies to use their telecommunication services in order to achieve a win-win situation for both the customers and companies is therefore an important object needed to be solved by the telecommunication companies.

SUMMARY OF THE INVENTION

In view of the shortcomings of the prior art that telecommunication service providers are not able to confirm the electronic communication device provided by them is used for the telecommunication service provided by them, the inventor of this invention conducted extensive studies and experiments and finally invented a method of performing an authentication on an identity module card by an electronic communication device. This method installs an identification software provided by a telecommunication company into an electronic communication device, such that when the said electronic communication device being turned on to start booting, the identification software will enable the said electronic communication device to check if a subscriber identity module card is installed in the said electronic communication device. If yes, request a user to input an authentication data provided by a telecommunication service provider into the electronic communication device and read an identification number stored in the subscriber identity module card. Then, determine whether the identification number is identical to the authentication data inputted. If not, it means that the subscriber identity module card installed in the electronic communication device is not the one originally provided by the telecommunication service provider. Thus, the identification software will stop the electronic communication device to proceed with the booting procedure, which ensures the user to use the electronic communication device provided by the telecommunication service provider through its own telecommunication network service.

BRIEF DESCRIPTION OF THE DRAWINGS

Other features and advantages of the present invention will become apparent in the following detailed description of the preferred embodiments with reference to the accompanying drawing.

DETAILED DESCRIPTION OF THE PREFERRED EMBODIMENTS

Figure 1:
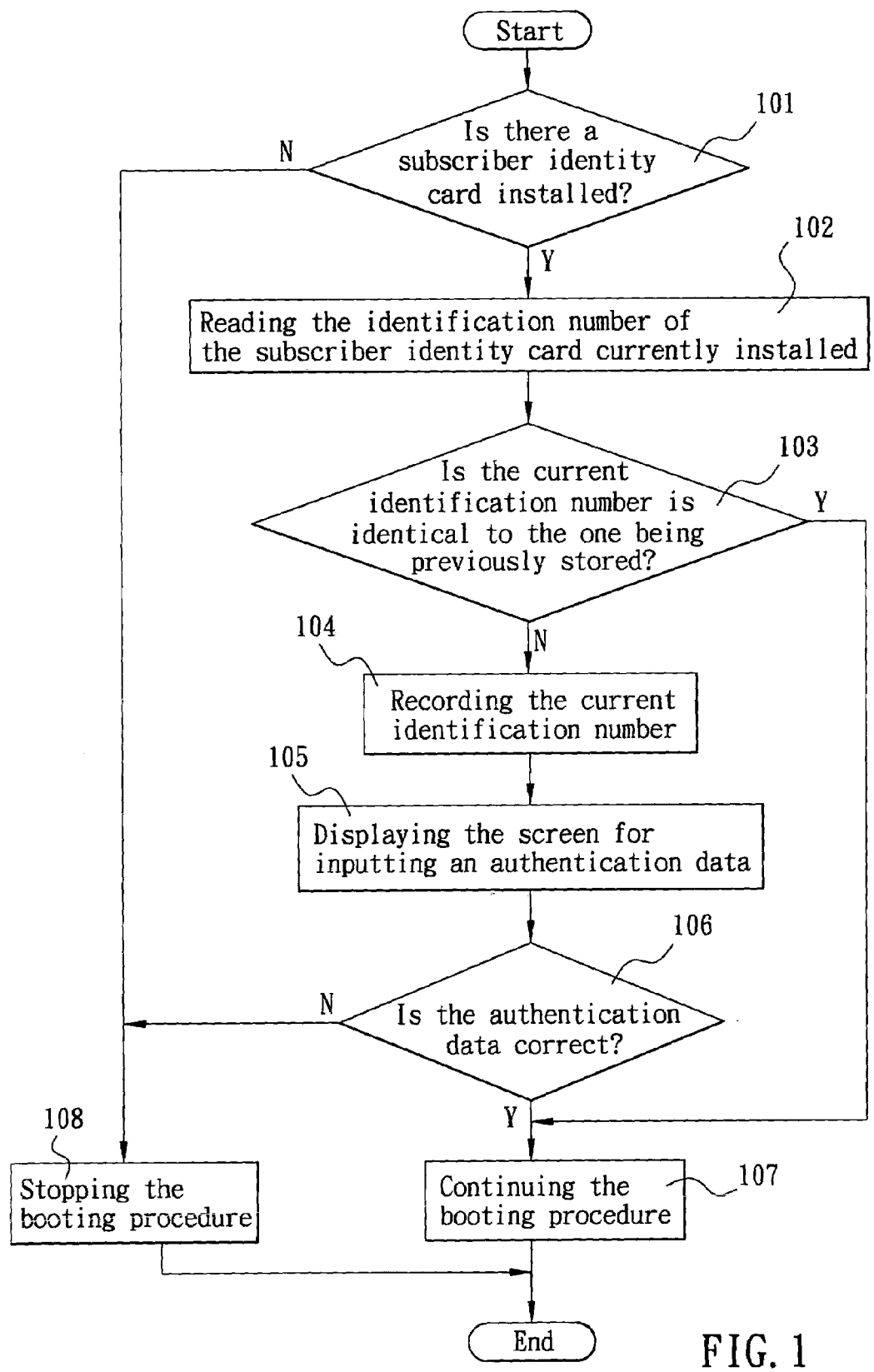
FIG. 1 is a flow chart of the present invention.

The method of the present invention utilizes an identification software provided by a telecommunication company and being installed into an electronic communication device. Such that when the said electronic communication device is turned on by a user to start booting, the identification software will enable the said electronic communication device to check if a subscriber identity module card is installed in the said electronic communication device. If yes, the said electronic communication device will request the user to input an authentication data provided by a telecommunication service provider into the electronic communication device and, at the same time, read an identification number stored in the subscriber identity module card. Then, the said electronic communication device will compare the identification number with the authentication data inputted to determine whether they are identical to each other. If the identification number isn't identical to the authentication data, it means that the subscriber identity module card installed in the electronic communication device is not the one originally provided by the telecommunication service provider. Thus, the identification software will stop the electronic communication device to proceed with the booting procedure, and prevent the user from using different subscriber identity module card provided by other telecommunication service providers. Therefore, the method of the present invention allows the telecommunication service providers to assure that the user has to use the electronic communication device provided by them through their own telecommunication network services to communicate with others.

In a preferred embodiment of the present invention, after an identification software being executed, the said electronic communication device will check if there is a subscriber identity module card being installed in the said electronic communication device. If yes, the electronic communication device will show a screen on a display of the said electronic communication device requesting a user to input an authentication data provided by a telecommunication service provider into the said screen. The said authentication data is provided for the identification software to compare with an identification number stored in the said subscriber identity module card in order to verify whether the said subscriber identity module installed in the said electronic communication device is the same one provided by the said telecommunication service provider. Such authentication data could be a password of at least one character.

In order to prevent the said identification software from being accessed by the user and avoid the user from easily obtaining and changing the said identification software installed in the said electronic communication device, the electronic device of this preferred embodiment is further installed with an encryption mechanism enabling said electronic communication device to produce an identification number identical to the one stored in the said subscriber identity module card provided by the said telecommunication service provider through encrypting the authentication data inputted by the user. Thus, even though the user has the ability to access the said identification software and change the authentication mechanism of said identification software. However, without knowing the said encryption mechanism, it is impossible for the user to make the said electronic communication device to thoroughly execute the identification software and be operated in a normal situation, which gives a double protection on the authentication mechanism and the rights of the telecommunication service providers.

In another preferred embodiment, the said identification software comprises a storage record and an authentication record, of which the storage record is used to record whether or not a subscriber identity module card has been installed in the said electronic communication device, and the authentication record is used to store the identification number of a subscriber module card installed in the electronic communication device, so that after the electronic communication device is turned on and the identification software is executed, the following steps will be processed:

(101) Checking the storage record stored at the previous shutdown whether or not a subscriber identity module card is installed in the electronic communication device; if yes, then go to step (102), otherwise, go to step (108);
(102) Reading the identification number of the subscriber identity module card previously stored in the storage record;
(103) Reading the identification number of the subscriber identity module card currently installed in the electronic communication device and comparing the same with the identification number previously stored in the storage record and determining whether they are identical; if yes, then go to step (107), otherwise, go to step (104);
(104) Recording the identification number of the current subscriber identity module card on the checking record;
(105) Showing a screen on a display of the electronic communication device requesting a user to input the authentication data provided by the telecommunication service provider;
(106) Determining whether or not the authentication data being inputted is identical to the one stored in the storage record; if yes, then go to step (107), otherwise, go to step (108);
(107) Continuing to execute the booting procedure;
(108) Stopping the booting procedure.

In view of the above, it is apparent that the method of the present invention allows the electronic communication device to identify, every time when the electronic communication device is turned on, if a subscriber identity module card provided by the telecommunication service provider is installed and if the identification number thereof is identical to the identification number of the original subscriber identity module card provided by the telecommunication service provider by means of the identification software before booting in order to ensure that the electronic communication device is used along with the subscriber identity module card provided by the telecommunication service provider and further protect their benefits thereon.

While the invention has been described by means of specific embodiments, numerous modifications and variations could be made thereto by those skilled in the art without departing from the scope and spirit of the invention set forth in the claims.

What is claimed is:

1. A method of performing an authentication on a subscriber identity module card by an electronic communication device, the electronic communication device being installed with an identification software provided by a telecommunication service provider, the identification software enabling the electronic communication device to proceed with the procedure comprising the steps of:

executing the identification software;
determining that the subscriber identity module card installed in the electronic communication device has been changed;
showing a screen on a display of the electronic communication device requesting a user to input an authentication data provided by the telecommunication service provider;
encrypting the authentication data by an encryption mechanism installed in the electronic communication device, and generating an identification number; and
determining whether the generated identification number is identical to an identification number stored in the subscriber identity module card and, if yes, continuing a booting procedure of the electronic communication device.

2. The method of claim 1, wherein said identification software further comprises a storage record and an authentication record, the storage record is used to record whether or not the subscriber identity module card installed in the electronic communication device has been changed, and the authentication record is used to store the identification number of the subscriber module card installed in the electronic communication device, enabling the electronic communication device to proceed with the procedure comprising the steps of:

checking the storage record stored at the previous shutdown whether or not the subscriber identity module card installed in the electronic communication device has been changed; if yes, then reading the identification number of the subscriber identity module card previously stored in the storage record; and
reading the identification number of the subscriber identity module card currently installed in the electronic communication device, comparing the same with the identification number previously stored in the storage record, and determining whether they are identical; if yes, then continuing to execute the booting procedure.

3. The method of claim 2, wherein said electronic communication device stops booting when a subscriber identity module card is not installed in the electronic communication device.

4. The method of claim 2, wherein when the identification number of the subscriber identity module card currently installed in the electronic communication device is not identical to the identification number stored in the storage record, the method further comprises the steps of:

recording the identification number of the current subscriber identity module card on the checking record;

showing a screen on a display of the electronic communication device requesting a user to input the authentication data provided by the telecommunication service provider; and determining whether or not the authentication data being inputted is identical to the one stored in the storage record; if yes, then continuing to execute the booting procedure.

5. The method of claim 2, wherein said electronic communication device stops booting if the authentication data being inputted is not identical to the one stored in the storage record.

* * * * *